United States Patent
Willenegger (10) Patent No.: US 8,046,018 B2
(45) Date of Patent: *Oct. 25, 2011

(54) NON-TRANSITORY STORAGE MEDIUM WITH STORED INSTRUCTIONS FOR CHANNELIZATION OF A DEDICATED PHYSICAL CHANNEL IN A WIRELESS COMMUNICATION SYSTEM

(75) Inventor: Serge Willenegger, Onnens (CH)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/781,605

(22) Filed: May 17, 2010

(65) Prior Publication Data

US 2010/0290399 A1 Nov. 18, 2010

Related U.S. Application Data (63) Continuation of application No. 11/354,549, filed on Feb. 14, 2006, now Pat. No. 7,720,497, which is a continuation of application No. 10/081,596, filed on Feb. 20, 2002, now Pat. No. 7,003,269.

(51) Int. Cl.
*H04B 1/00* (2006.01)
*H04W 4/00* (2009.01)
(52) U.S. Cl. ........ 455/515; 455/434; 375/146; 370/320; 370/335; 370/342
(58) Field of Classification Search .................. None
See application file for complete search history.

(56) References Cited

U.S. PATENT DOCUMENTS

| | | | |
|---|---|---|---|
| 6,028,884 A | 2/2000 | Silberger et al. | |
| 6,137,789 A | 10/2000 | Honkasalo | |
| 6,240,081 B1 | 5/2001 | Khalona | |
| 6,278,702 B1 | 8/2001 | Deane et al. | |
| 6,490,267 B1 | 12/2002 | Kim et al. | |
| 6,504,862 B1 | 1/2003 | Yang et al. | |
| 7,099,371 B2 | 8/2006 | Roh | |
| 7,720,497 B2 * | 5/2010 | Willenegger | 455/515 |
| 2002/0018457 A1 | 2/2002 | Choi et al. | |

(Continued)

FOREIGN PATENT DOCUMENTS

| | | |
|---|---|---|
| EP | 1471656 A2 | 10/2004 |
| WO | WO0118987 A1 | 3/2001 |

OTHER PUBLICATIONS

European Search Report—EP07007460—The Search Authority—Munich Patent Office—May 16, 2007.

(Continued)

*Primary Examiner* — Philip Sobutka (74) *Attorney, Agent, or Firm* — Jeffrey D. Jacobs; Jeffrey D. Jacobs (57) ABSTRACT

Method and apparatus for determining a transmission configuration for a dedicated channel in a wireless communication system. In one embodiment, an optimum configuration is determined based on minimizing Peak-to-Average Ratio (PAR) of the channel. The configuration is defined as a transmission pair of transmission branch and spreading code. The transmission branch may be the In-Phase (I) branch or the Quadrature (Q) branch. PAR analysis may be performed off-line to determine the optimum configuration. In operation, if the spreading code of the optimum configuration is used by another channel, the next best optimum code is used.

4 Claims, 11 Drawing Sheets

U.S. PATENT DOCUMENTS

2002/0172168 A1 11/2002 Meier et al.
2003/0063556 A1 4/2003 Hernandez
2004/0100925 A1 5/2004 Niwano

OTHER PUBLICATIONS

International Search Report—PCT/US03/005370, International Search Authority, European Patent Office, Jun. 13, 2003.

"3rd Generation Partnership Project; Technical Specification Group Radio Access Network; Spreading and Modulation (FDD)" (Release 1999), identifies as Technical Specification 3GPP TS25.213 V3.7.0 (Dec. 2001).Articles \3GPP_Technical_Spec_Group_Radio_Access_Network_Spreading_and_Modulation_(FDD)_identifies_as_Technical_Specification_3GPP TS25.213_V3.7.0.pdf.

* cited by examiner

NON-TRANSITORY STORAGE MEDIUM WITH STORED INSTRUCTIONS FOR CHANNELIZATION OF A DEDICATED PHYSICAL CHANNEL IN A WIRELESS COMMUNICATION SYSTEM

CLAIM OF PRIORITY Under 35 U.S.C. §120

The present Application for Patent is a Continuation of patent application Ser. No. 11/354,549 entitled "Method and Apparatus for a Dedicated Physical Channel in a Wireless Communication System" filed Feb. 14, 2006, now U.S. Pat. No. 7,720,497, issued May 18, 2010, assigned to the assignee hereof and hereby expressly incorporated by reference, which is a Continuation of patent application Ser. No. 10/081,596 entitled "Method and Apparatus for a Dedicated Physical Channel in a Wireless Communication System" filed Feb. 20, 2002, now U.S. Pat. No. 7,003,269, issued Feb. 21, 2006, assigned to the assignee hereof and hereby expressly incorporated by reference.

BACKGROUND

1. Field

The present invention relates to methods and apparatus for providing a dedicated physical channel in a wireless communication system.

2. Background

In an exemplary wireless communication system supporting packetized data communications, mobile receivers provide feedback to a transmitter acknowledging receipt of data packets. The feedback may also provide information relating to the channel condition of the link from transmitter to receiver, referred to as the downlink. The feedback is then provided on the uplink. A dedicated channel is allocated for transmission of the feedback information. As the resources of the communication system are limited, it is desirable to optimize use of the uplink.

There is a need, therefore, for an efficient and accurate method of providing feedback information on an uplink of a wireless communication system. Further, there is a need for a method and apparatus for transmitting feedback information so as to minimize the Peak-to-Average Ratio (PAR) of the transmitted signal.

DETAILED DESCRIPTION

The word "exemplary" is used exclusively herein to mean "serving as an example, instance, or illustration." Any embodiment described herein as "exemplary" is not necessarily to be construed as preferred or advantageous over other embodiments.

In a spread-spectrum wireless communication system, such as a cdma2000 system, multiple users transmit to a transceiver, often a base station, in the same bandwidth at the same time. In one embodiment the transceiver is referred to as a Node B, wherein the Node B is a logical node responsible for radio transmission/reception in one or more cells to/from the User Equipment. The base station may be any data device that communicates through a wireless channel or through a wired channel, for example using fiber optic or coaxial cables. A user may be any of a variety of mobile and/or stationary devices including but not limited to a PC card, a compact flash, an external or internal modem, or a wireless or a wireline phone. A user is also referred to as a remote station or User Equipment (UE). Note that alternate spread-spectrum systems include systems: packet-switched data services; Wideband-CDMA, W-CDMA, systems, such as specified by Third Generation Partnership Project, 3GPP; voice and data systems, such as specified by Third Generation Partnership Project Two, 3GPP2.

An exemplary embodiment is provided throughout the following discussion to provide a clearer understanding. The exemplary embodiment is consistent with a system defined in "3rd Generation Partnership Project; Technical Specification Group Radio Access Network; Spreading and modulation (FDD)" (Release 1999), identified as Technical Specification 3GPP TS 25.213 V3.7.0 (2001-12).

Figure 1:
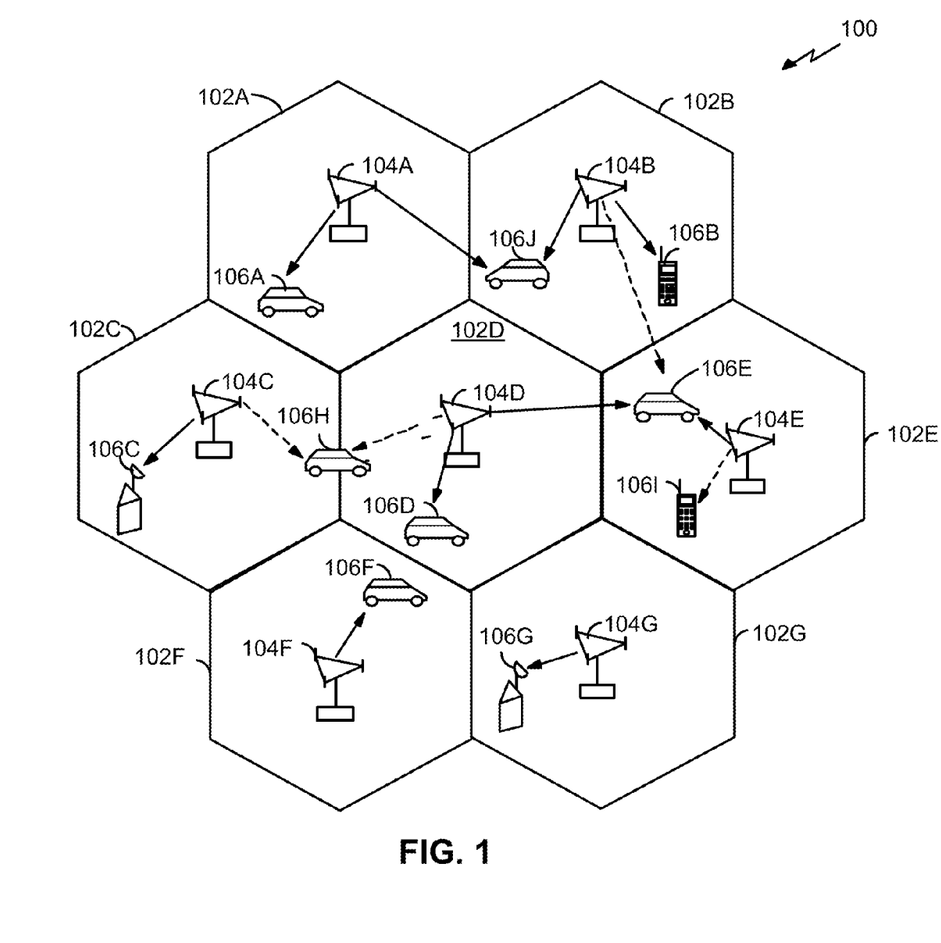
FIG. 1 is a diagram of a wireless communication system.

FIG. 1 serves as an example of a communications system 100 that supports a number of users and is capable of implementing at least some aspects of the embodiments discussed herein. Any of a variety of algorithms and methods may be used to schedule transmissions in system 100. System 100 provides communication for a number of cells 102A-102G, each of which is serviced by a corresponding base station 104A-104G, respectively. In the exemplary embodiment, some of the base stations 104 have multiple receive antennas and others have only one receive antenna. Similarly, some of the base stations 104 have multiple transmit antennas, and others have single transmit antennas. There are no restrictions on the combinations of transmit antennas and receive antennas. Therefore, it is possible for a base station 104 to have multiple transmit antennas and a single receive antenna, or to have multiple receive antennas and a single transmit antenna, or to have both single or multiple transmit and receive antennas.

Terminals 106 in the coverage area may be fixed (i.e., stationary) or mobile. As shown in FIG. 1, various terminals 106 are dispersed throughout the system. Each terminal 106 communicates with at least one and possibly more base stations 104 on the downlink and uplink at any given moment depending on, for example, whether soft handoff is employed or whether the terminal is designed and operated to (concurrently or sequentially) receive multiple transmissions from multiple base stations.

The downlink refers to transmission from the base station 104 to the terminal 106, and the uplink refers to transmission from the terminal 106 to the base station 104. In the exemplary embodiment, some of terminals 106 have multiple receive antennas and others have only one receive antenna. In FIG. 1, base station 104A transmits data to terminals 106A and 106J on the downlink, base station 104B transmits data to terminals 106B and 106J, base station 104C transmits data to terminal 106C, and so on.

Generally, in wideband technologies, the entire bandwidth is made available to each mobile user; this bandwidth is many times larger than the bandwidth required to transmit information. Such systems are generally referred to as spread-spectrum systems, which have the ability to tolerate signal interference. In an exemplary system, a carrier signal is modulated by a digital code in which the code bit rate is much larger than the information signal bit rate. These systems are also called PseudoNoise (PN) systems.

For transmission of signals in the exemplary embodiment, both uplink and downlink, spreading is applied to the physical channels, wherein the spreading operation consists of two operations: channelization; and scrambling. Channelization transforms every data symbol into a number of chips (or bits), thus increasing the bandwidth of the signal. The number of chips per data symbol is called the Spreading Factor (SF). In the scrambling operation, a scrambling code is applied to the spread signal.

With the channelization, data symbols on In-phase (I) and Quadrature (Q) branches are independently multiplied with an Orthogonal Variable Spreading Factor (OVSF) code. With the scrambling operation, the resultant signals on the I and Q branches are further multiplied by complex-valued scrambling code, where I and Q denote real and imaginary parts, respectively.

Figure 2:
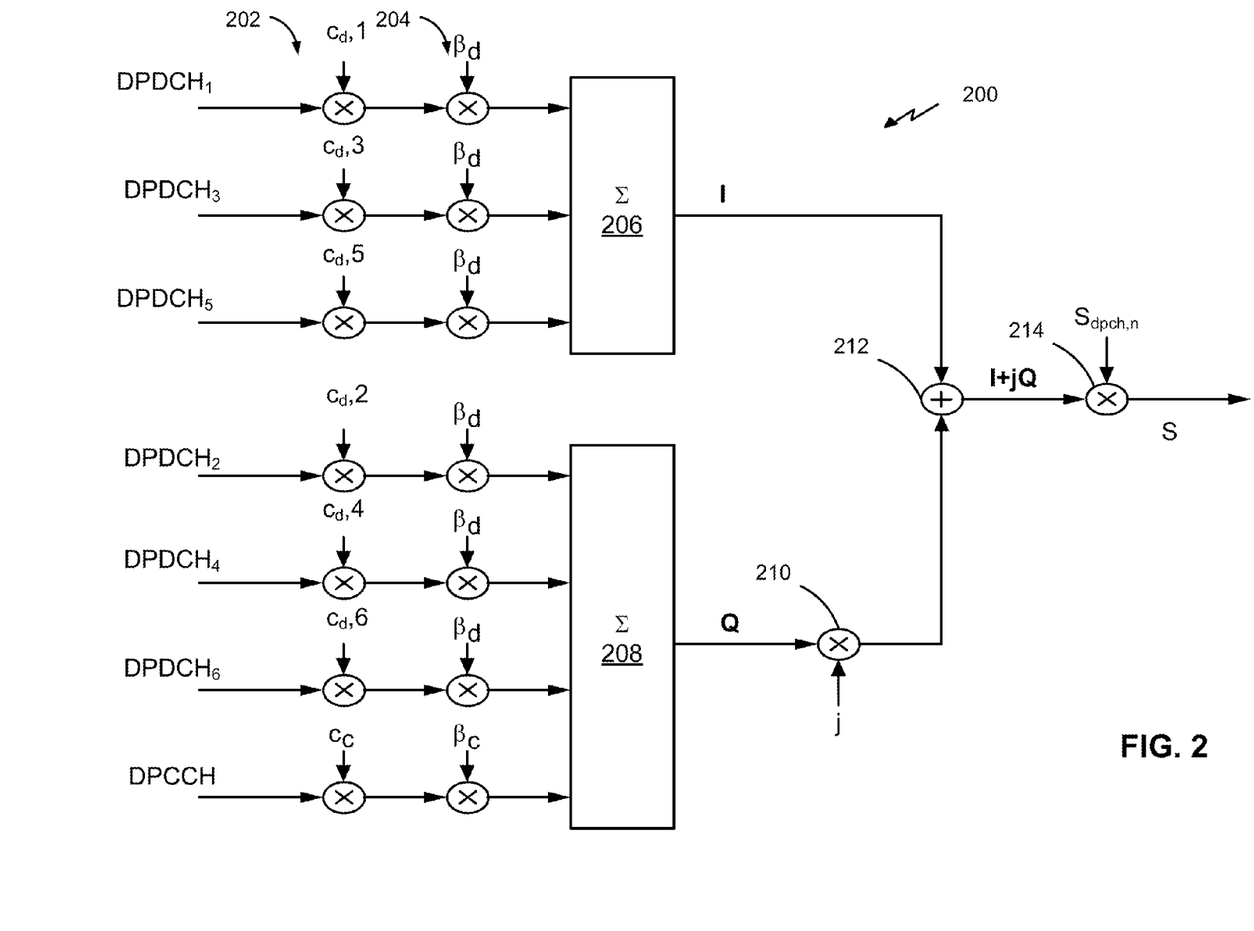
FIG. 2 is a diagram of uplink spreading of the Dedicated Physical Control Channel (DPCCH) and Dedicated Physical Data Channels (DPDCHs).

FIG. 2 illustrates uplink spreading of Dedicated Physical Control Channel (DPCCH) and Dedicated Physical Data Channels (DPDCHs) in the exemplary wireless communication system. For channelization, the DPCCH and DPDCHs are each provided to one of multipliers 202, wherein a code specific to the channel is also applied to each of multipliers 202. The output of each of the multipliers 202 is provided to one of multipliers 204. Weights are applied to each of the multipliers 204 corresponding to the channelized values received from multipliers 202. The outputs of multipliers 204, i.e., the weighted, channelized signals, are provided to summation nodes 206 and 208 as illustrated. Summation node 206 is part of the I branch, while summation node 208 is part of the Q branch. The output of summation node 208 and a complex multiplier j are provided to multiplier 210. The output of summation node 206, the I component, and the output of multiplier 210, and the Q component are then provided to node 212 to form a complex representation of the channelized signals. The output of node 212, I+jQ, is provided to multiplier 214 for application of a scrambling code. The resultant weighted, channelized, scrambled complex representation is provided as an output of multiplier 214.

In operation of the exemplary embodiment, the binary DPCCH and DPDCHs to be spread are represented by real-valued sequences, i.e. the binary value "0" is mapped to the real value +1, while the binary value "1" is mapped to the real value −1. The DPCCH is spread to the chip rate by the channelization code $c_c$, while the n:th DPDCH called DPDCH$_n$ is spread to the chip rate by the channelization code $c_{d,n}$. In the exemplary embodiment, illustrated in FIG. 2, one DPCCH and up to six parallel DPDCHs may be transmitted simultaneously, i.e. $1 \leq n \leq 6$.

After channelization, the real-valued spread signals are weighted by gain factors, $\beta_c$ for DPCCH and $\beta_d$ for all DPDCHs. At every instant in time, at least one of the values $\beta_c$ and $\beta_d$ has the amplitude 1.0. The β-values are quantized into 4 bit words. The quantization steps of the gain parameters are given in Table 1.

TABLE 1

| Signalling values for $\beta_c$ and $\beta_d$ | Quantized amplitude ratios $\beta_c$ and $\beta_d$ |
|---|---|
| 15 | 1.0 |
| 14 | 14/15 |
| 13 | 13/15 |
| 12 | 12/15 |
| 11 | 11/15 |
| 10 | 10/15 |
| 9 | 9/15 |
| 8 | 8/15 |
| 7 | 7/15 |
| 6 | 6/15 |
| 5 | 5/15 |
| 4 | 4/15 |
| 3 | 3/15 |
| 2 | 2/15 |
| 1 | 1/15 |
| 0 | Switch off |

After the weighting, the stream of real-valued chips on the I branch and the Q branch are summed and treated as a complex-valued stream of chips. This complex-valued signal is then scrambled by the complex-valued scrambling code $S_{dpch,n}$. The scrambling code is applied aligned with the radio frames, i.e. the first scrambling chip corresponds to the beginning of a radio frame.

The channelization codes used in the exemplary embodiment of FIG. 2 are Orthogonal Variable Spreading Factor (OVSF) codes that preserve the orthogonality between a user's different physical channels. The OVSF codes can be defined using the code tree illustrated in FIG. 3, wherein the channelization codes are uniquely described as $C_{ch,SF,k}$. Here SF is the spreading factor of the code and k is the code number, $0 \leq k \leq SF-1$. Each level in the code tree defines channelization codes of length SF, corresponding to a spreading factor of SF.

Figure 3:
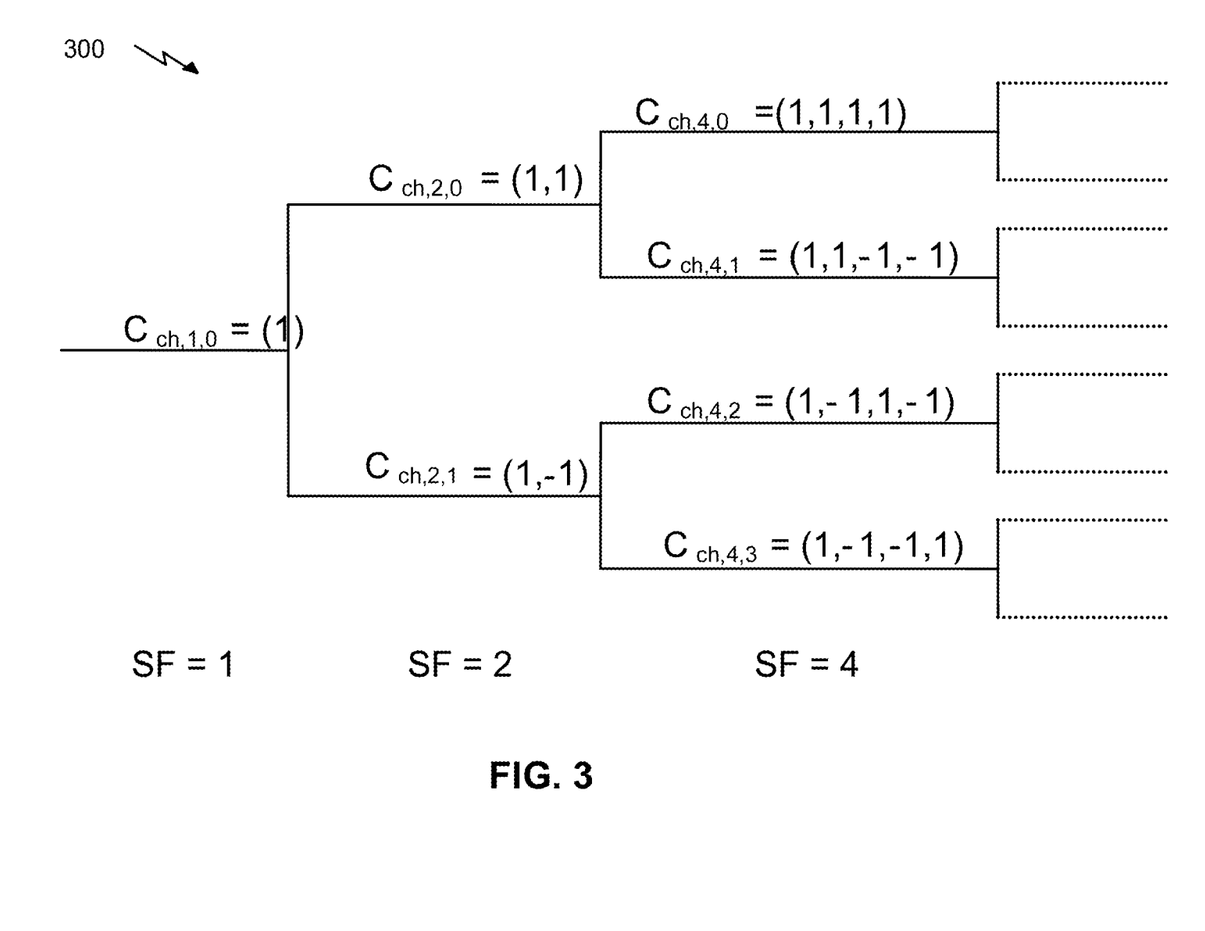
FIG. 3 is a diagram of a code-tree for generation of Orthogonal Variable Spreading Factor (OVSF) codes.

The generation method for the channelization code is defined as given in the following equations:

$$C_{ch,1,0} = 1, \tag{1}$$

$$\begin{bmatrix} C_{ch,2,0} \\ C_{ch,2,1} \end{bmatrix} = \begin{bmatrix} C_{ch,1,0} & C_{ch,1,0} \\ C_{ch,1,0} & -C_{ch,1,0} \end{bmatrix} = \begin{bmatrix} 1 & 1 \\ 1 & -1 \end{bmatrix} \tag{2}$$

$$\begin{bmatrix} C_{ch,2^{(n+1)},0} \\ C_{ch,2^{(n+1)},1} \\ C_{ch,2^{(n+1)},2} \\ C_{ch,2^{(n+1)},3} \\ \vdots \\ C_{ch,2^{(n+1)},2^{(n+1)}-2} \\ C_{ch,2^{(n+1)},2^{(n+1)}-1} \end{bmatrix} = \begin{bmatrix} C_{ch,2^n,0} & C_{ch,2^n,0} \\ C_{ch,2^n,0} & -C_{ch,2^n,0} \\ C_{ch,2^n,1} & C_{ch,2^n,1} \\ C_{ch,2^n,1} & -C_{ch,2^n,1} \\ \vdots & \vdots \\ C_{ch,2^n,2^n-1} & C_{ch,2^n,2^n-1} \\ C_{ch,2^n,2^n-1} & -C_{ch,2^n,2^n-1} \end{bmatrix} \tag{3}$$

The leftmost value in each channelization code word corresponds to the chip transmitted first in time.

In the exemplary embodiment, the DPCCH is spread by the code given as:

$$c_c = C_{ch,256,0} \tag{4}$$

wherein there are 256 total available codes, and the control channel DPCCH uses the code identified by 0.

When only one DPDCH is to be transmitted, DPDCH$_1$ is spread by the code given as:

$$c_{d,1} = C_{ch,SF,k} \tag{5}$$

wherein SF is the spreading factor of DPDCH$_1$ and k=SF/4. When more than one DPDCH is to be transmitted, all DPDCHs have spreading factors equal to 4. DPDCH$_n$ is spread by the code given as:

$$c_{d,n}=C_{ch,4,k} \quad (6)$$

wherein k=1 if n∈{1, 2}, k=3 if n∈{3, 4}, and k=2 if n∈{5, 6}.

If a power control preamble is used to initialize a Data Channel (DCH), the channelization code for the DPCCH during the power control preamble shall be the same as that to be used afterwards.

All uplink physical channels are subjected to scrambling with a complex-valued scrambling code. The DPCCH/DPDCH may be scrambled by either long or short scrambling codes. There are $2^{24}$ long and $2^{24}$ short uplink scrambling codes. Uplink scrambling codes are assigned by higher layers of a communication system. The long scrambling code is built from constituent long sequences, while the constituent short sequences used to build the short scrambling code.

The long scrambling sequences $c_{long,1,n}$ and $c_{long,2,n}$ are constructed from position wise modulo 2 sum of 38400 chip segments of two binary m-sequences generated by means of two generator polynomials of degree 25. Let x, and y be the two m-sequences respectively. The x sequence is constructed using the primitive (over GF(2)) polynomial $X^{25}+X^3+1$. The y sequence is constructed using the polynomial $X^{25}+X^3+X^2+X+1$. The resulting sequences thus constitute segments of a set of Gold sequences.

The sequence $c_{long,2,n}$ is a 16777232 chip shifted version of the sequence $c_{long,1,n}$. Let $n_{23} \ldots n_0$ be the 24 bit binary representation of the scrambling sequence number n with $n_0$ being the least significant bit. The x sequence depends on the chosen scrambling sequence number n and is denoted $x_n$, in the sequel. Furthermore, let $x_n(i)$ and $y(i)$ denote the i:th symbol of the sequence $x_n$ and y, respectively. The m-sequences $x_n$ and y are constructed as follows. The initial conditions are given as:

$$x_n(0)=n_0, x_n(1)=n_1, \ldots =x_n(22)=n_{22}, x_n(23)=n_{23}, x_n(24)=1, \text{ and} \quad (7)$$

$$y(0)=y(1)=\ldots=y(23)=y(24)=1 \quad (8)$$

Recursive definition of subsequent symbols are performed according to:

$$x_n(i+25)=x_n(i+3)+x_n(i) \text{modulo } 2, i=0, \ldots, 2^{25}-27 \quad (9)$$

$$y(i+25)=y(i+3)+y(i+2)+y(i+1)+y(i) \text{modulo } 2, i=0, \ldots, 2^{25}-27. \quad (10)$$

The process defines the binary Gold sequence $z_n$ by:

$$z_n(i)=x_n(i)+y(i) \text{modulo } 2, i=0, 1, 2, \ldots, 2^{25}-2; \quad (11)$$

and the real valued Gold sequence $Z_n$ is defined by:

$$Z_n(i) = \begin{cases} +1 & \text{if } z_n(i)=0 \\ -1 & \text{if } z_n(i)=1 \end{cases} \text{ for } i=0, 1, \ldots, 2^{25}-2. \quad (12)$$

The real-valued long scrambling sequences $c_{long,1,n}$ and $c_{long,2,n}$ are defined as follows:

$$c_{long,1,n}(i)=Z_n(i), i=0, 1, 2, \ldots, 2^{25}-2 \text{ and} \quad (13)$$

$$c_{long,2,n}(i)=Z_n((i+16777232)\text{modulo}(2^{25}-1)), i=0, 1, 2, \ldots, 2^{25}-2. \quad (14)$$

Finally, the complex-valued long scrambling sequence $C_{long,n}$ is defined as:

$$C_{long,n}(i)=c_{long,1,n}(1+j(-1)^i C_{long,2,n}(2\lfloor i/2 \rfloor)), \quad (15)$$

wherein i=0, 1, ..., $2^{25}-2$; and $\lfloor \; \rfloor$ denotes rounding to nearest lower integer.

Figure 4:
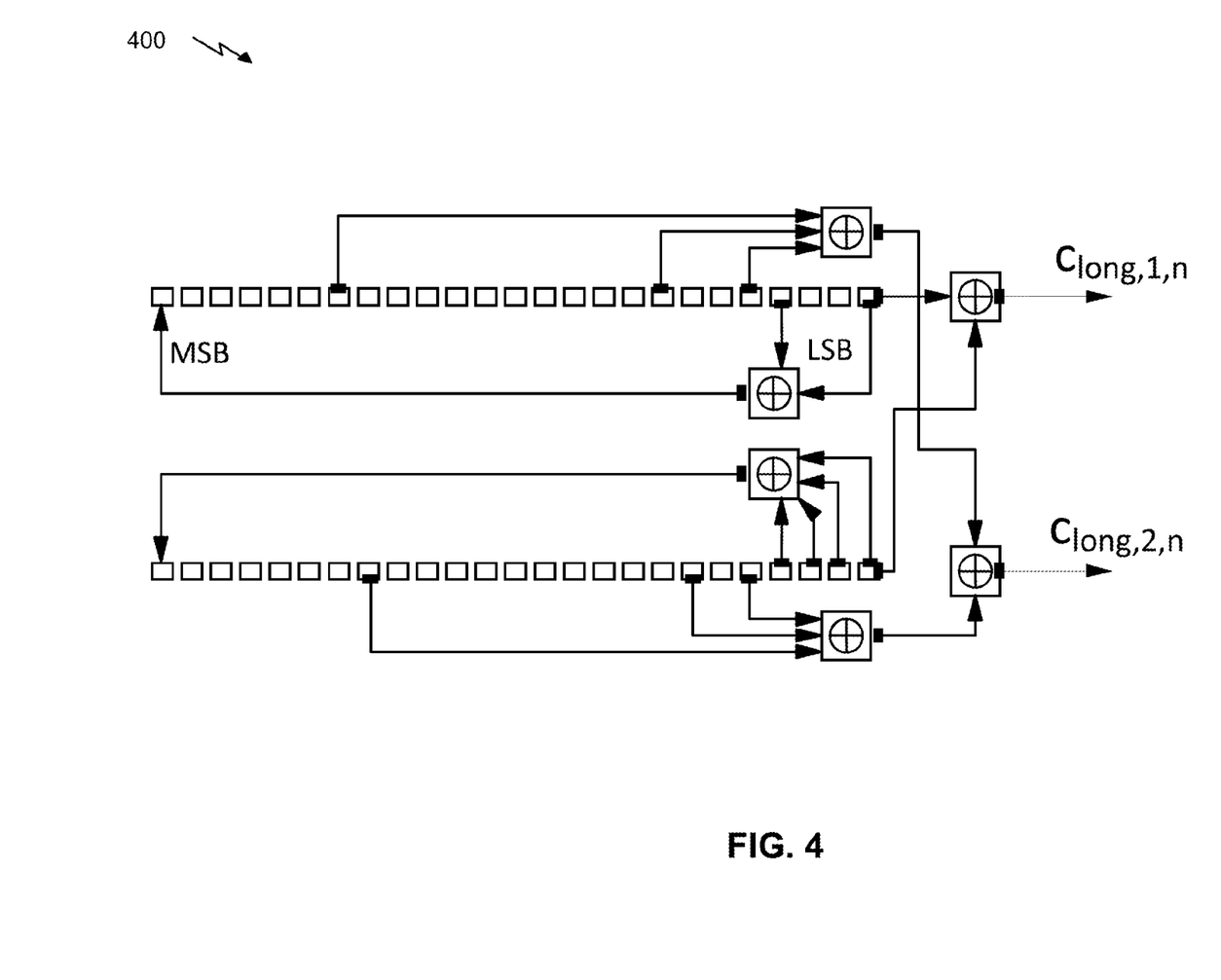
FIG. 4 is a diagram of an uplink scrambling sequence generator.

FIG. 4 illustrates a configuration of an uplink scrambling sequence generator according to one embodiment. The short scrambling sequences $c_{short,1,n}(i)$ and $c_{short,2,n}(i)$ are defined from a sequence from the family of periodically extended S(2) codes. Let $n_{23}n_{22} \ldots n_0$ be the 24 bit binary representation of the code number n. The n:th quaternary S(2) sequence $z_n(i)$, $0 \leq n \leq 16777215$, is obtained by modulo 4 addition of three sequences, a quaternary sequence a(i) and two binary sequences b(i) and d(i), where the initial loading of the three sequences is determined from the code number n. The sequence $z_n(i)$ of length 255 is generated according to the following relation:

$$z_n(i)=a(i)+2b(i)+2d(i)\text{modulo } 4, i=0, 1, \ldots, 254; \quad (16)$$

where the quaternary sequence a(i) is generated recursively by the polynomial:

$$g_0(x)=x^8+x^5+3x^3+x^2+2x+1 \quad (17)$$

as:

$$a(0)=2n_0+1 \text{ modulo } 4; \quad (18)$$

$$a(i)=2n_i \text{ modulo } 4, i=1, 2, \ldots, 7; \quad (19)$$

$$a(i)=3a(i-3)+a(i-5)+3a(i-6)+2a(i-7)+3a(i-8)\text{modulo } 4, i=8, 9, \ldots, 254; \quad (20)$$

and the binary sequence b(i) is generated recursively by the polynomial:

$$g_1(x)=x^8+x^7+x^5+x+1 \quad (21)$$

as $$b(i)=n_{8+i} \text{ modulo } 2, i=0, 1, \ldots, 7, \quad (22)$$

$$b(i)=b(i-1)+b(i-3)+b(i-7)+b(i-8)\text{modulo } 2, i=8, 9, \ldots, 254, \quad (23)$$

and the binary sequence d(i) is generated recursively by the polynomial:

$$g_2(x)=x^8+x^7+x^5+x^4+1$$

as:

$$d(i)=n_{16+i} \text{ modulo } 2, i=0, 1, \ldots, 7; \quad (24)$$

$$d(i)=d(i-1)+d(i-3)+d(i-4)+d(i-8)\text{modulo } 2, i=8, 9, \ldots, 254. \quad (25)$$

The sequence $z_n(i)$ is extended to length 256 chips by setting $z_n(255)=z_n(0)$.

The mapping from $z_n(i)$ to the real-valued binary sequences $c_{short,1,n}(i)$ and $c_{short,2,n}(i)$, i=0, 1, ..., 255 is defined in Table 2.

TABLE 2

| $Z_n(i)$ | $C_{short,1,n}(i)$ | $C_{short,2,n}(i)$ |
|---|---|---|
| 0 | +1 | +1 |
| 1 | −1 | +1 |
| 2 | −1 | −1 |
| 3 | +1 | −1 |

Finally, the complex-valued short scrambling sequence $C_{short, n}$, is defined as:

$$C_{short,n}(i)=c_{short,1,n}(i \bmod 256)(1+j(-1)^i c_{short,2,n}(2\lfloor(i \bmod 256)/2\rfloor)) \quad (26)$$

wherein i=0, 1, 2, ... and ⌊ ⌋ denotes rounding to nearest lower integer.

Figure 5:
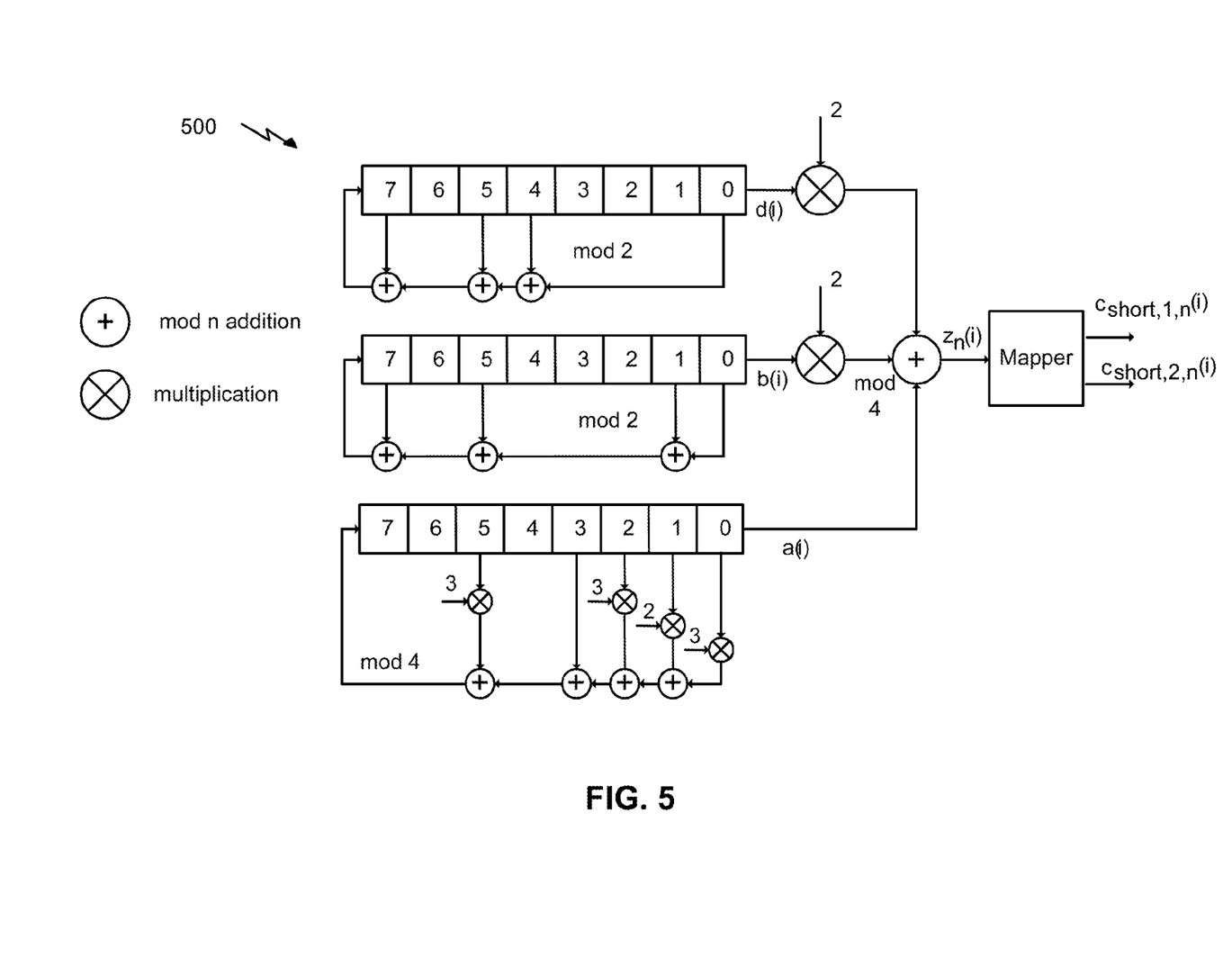
FIG. 5 is a diagram for an uplink short scrambling sequence generator for a 255 chip sequence.

An implementation of the short scrambling sequence generator for the 255 chip sequence to be extended by one chip is illustrated in FIG. 5. The code used for scrambling of the uplink DPCCH/DPDCH may be of either long or short type. When the scrambling code is formed, different constituent codes are used for the long and short type as defined below. The n:th uplink scrambling code for DPCCH/DPDCH, denoted $S_{dpch, n}$, is defined as:

$$S_{dpch,n}(i)=C_{long,n}(i), i=0, 1, \ldots, 38399, \quad (27)$$

when using long scrambling codes; wherein the lowest index corresponds to the chip transmitted first in time. The n:th uplink scrambling code for DPCCH/DPDCH, denoted $S_{dpch,n}$, is defined as:

$$S_{dpch,n}(i)=C_{short,n}(i), i=0, 1, \ldots, 38399, \quad (28)$$

when using short scrambling codes; wherein the lowest index corresponds to the chip transmitted first in time.

In a high speed data system supporting packetized data communications, a High Speed-Dedicated Physical Control Channel (HS-DPCCH) may be used for uplink transmissions. It is desirable to minimize the Peak-to-Average Ratio (PAR) of the transmitted signal on such a dedicated channel. Depending on the configuration and coding of a given communication system, the PAR may become very large. Note that the peak power may be subject to a design or regulatory limit which results in a reduction in the effective range of the transmissions. This is particularly acute in mobile applications where conservation of battery power is a key consideration. In addition, such constraints may result in suboptimum power amplifier operation, i.e., operation below a desired compression point where power is converted most efficiently. The net result is increased expense and inefficient allocation of resources. Therefore, high PAR may present serious drawbacks to the communication system.

To overcome these and other problems, the exemplary embodiment determines an optimum transmission configuration of the dedicated channel parameters, such as the DPCCH, as the configuration that minimizes the PAR. The method determines a transmission pair, consisting of a transmission branch and a spreading code. The DPCCH may be mapped to the I branch or the Q branch. In a given communication system, a given code may perform differently on each branch. The determination may be performed off-line, or may be determined during operation, wherein a default transmission pair is used to initialize the system, and the transmission pair decision is revisited during operation.

Figure 6:
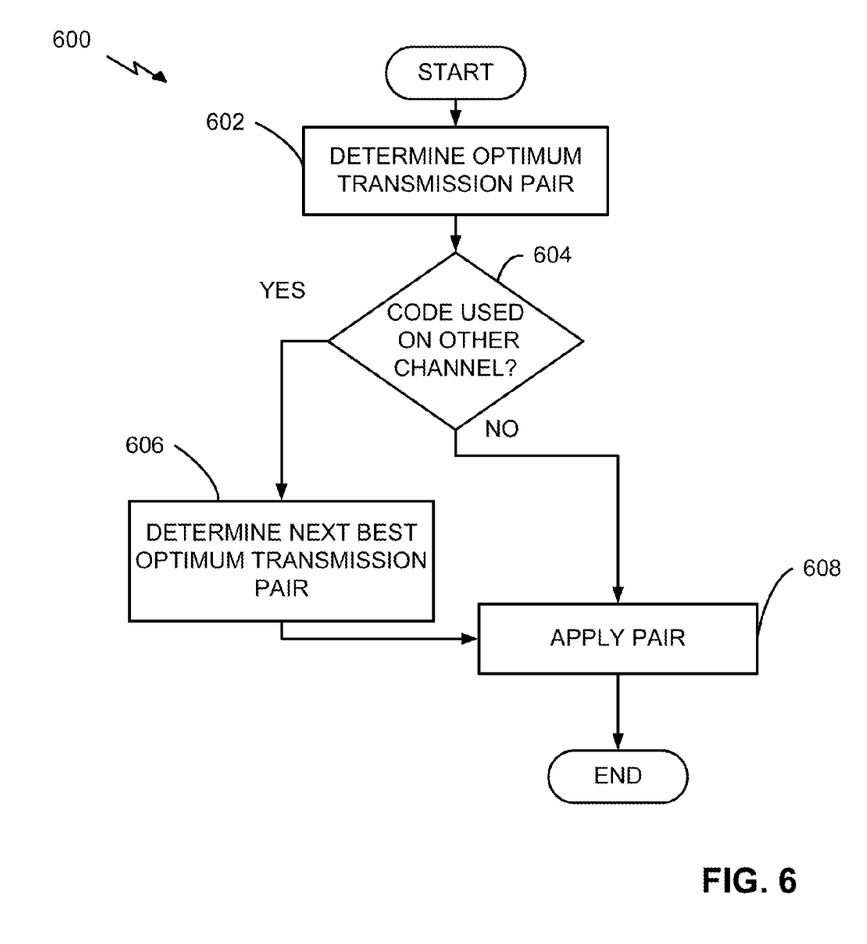
FIG. 6 is a flow diagram of a method for selecting a transmission pair of modulation path and spreading code for a dedicated channel.
Figure 7A:
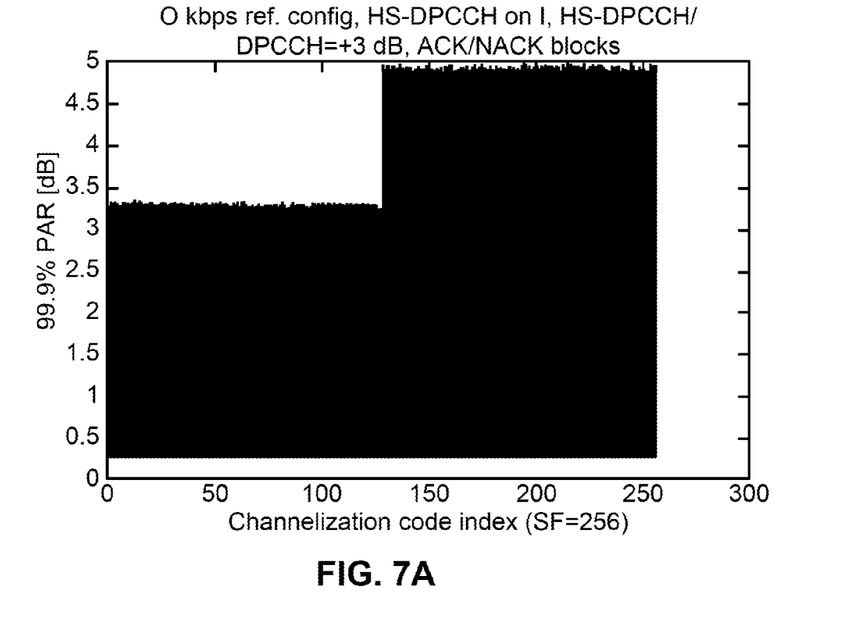
FIGS. 7A through 7H illustrate simulation results for determining from various transmission configurations of a dedicated channel, an optimum transmission configuration to minimize PAR on the channel.
Figure 7B:
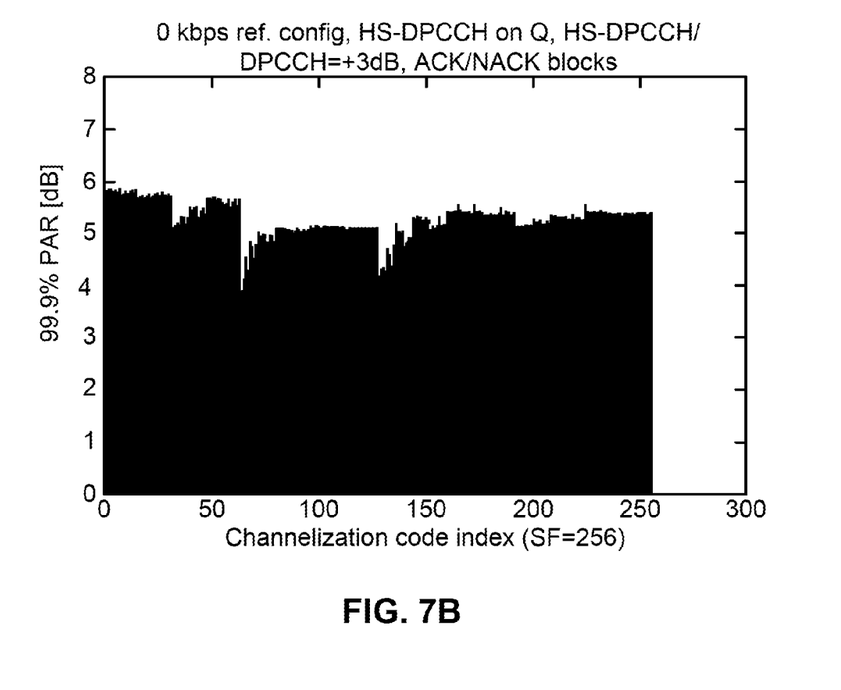
Figure 7C:
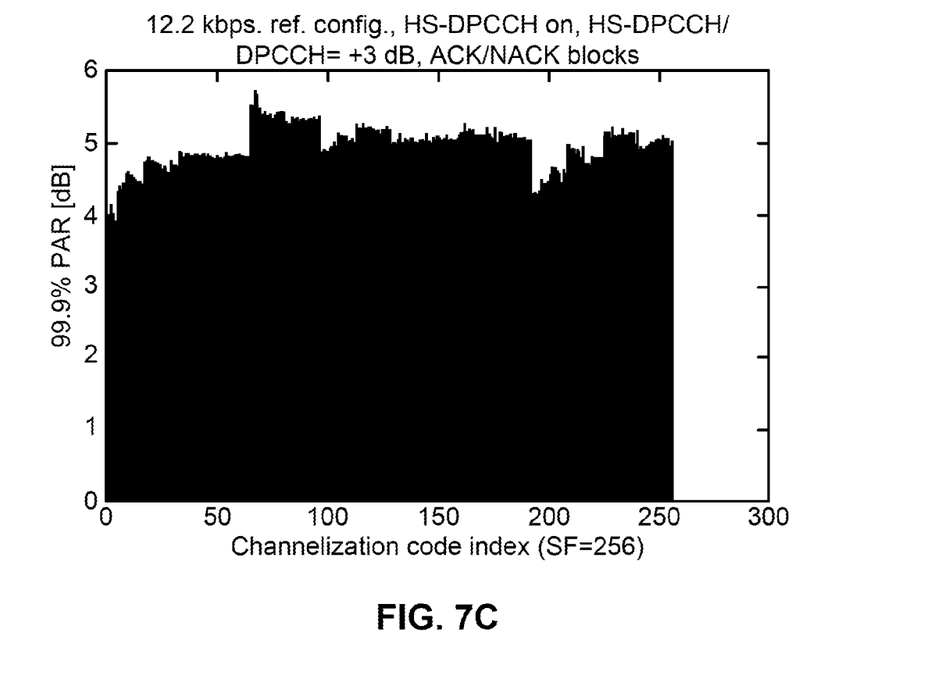
Figure 7D:
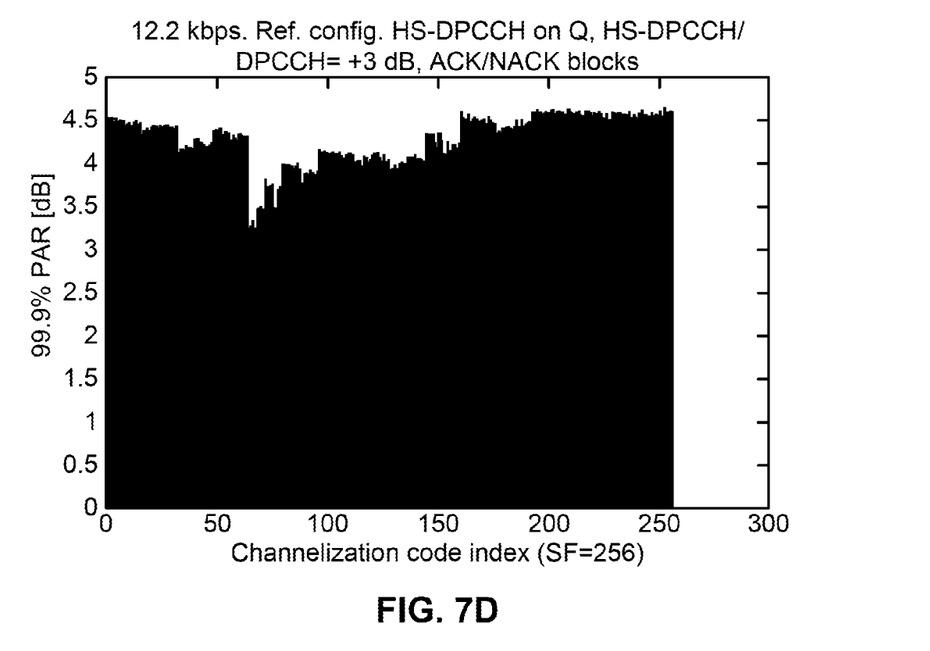
Figure 7E:
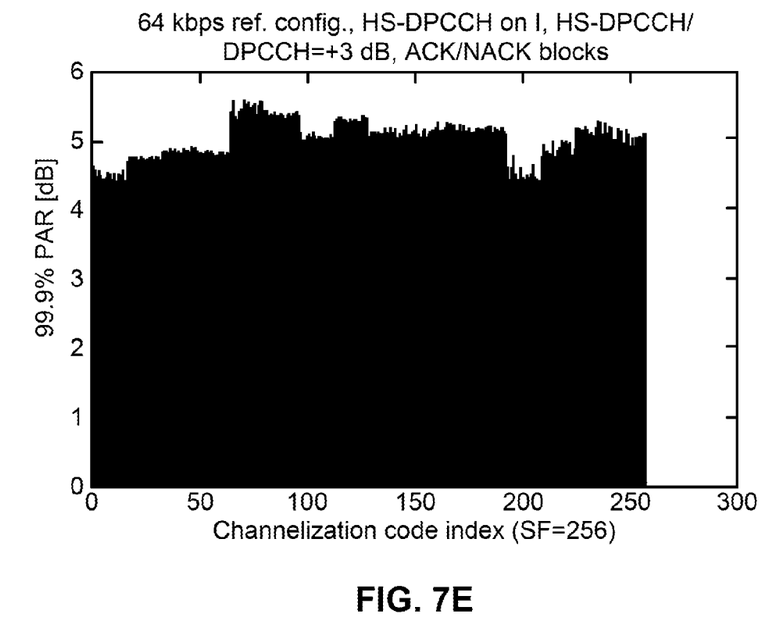
Figure 7F:
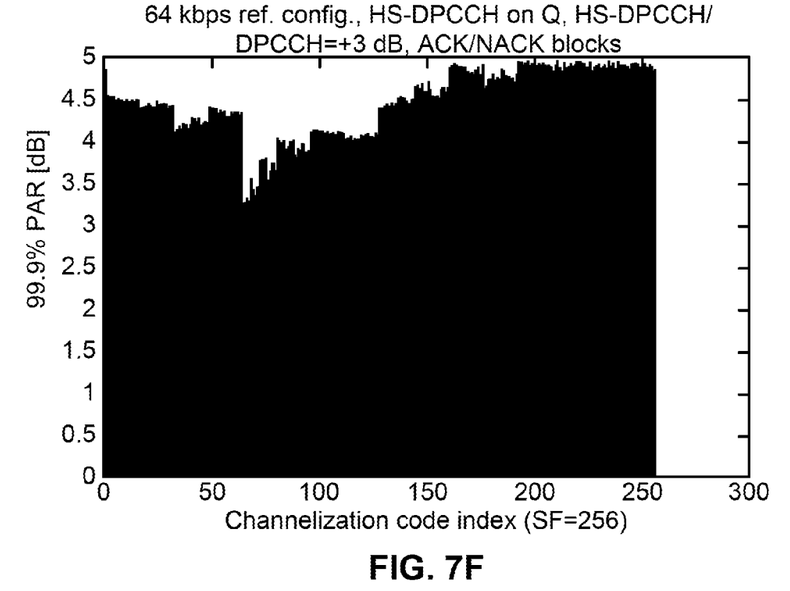
Figure 7G:
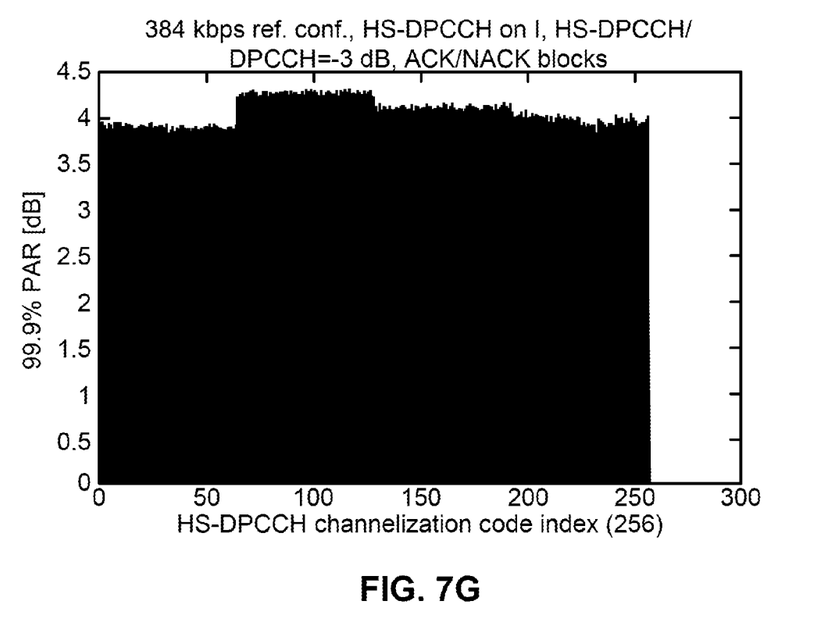
Figure 7H:
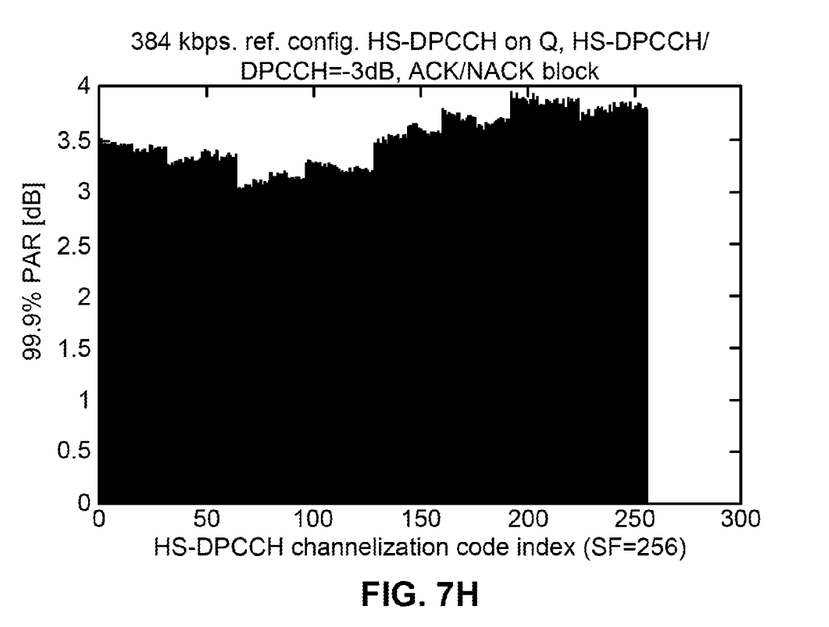

FIG. 6 illustrates a method for selecting a transmission pair including a modulation path, i.e., I branch or Q branch, and a spreading code. The process 600 begins at step 602 where an optimum transmission pair is determined. In the exemplary embodiment, the determination is based on a resultant PAR value. The PAR value may be determined in off-line simulations, such as that detailed hereinbelow. Once the optimum transmission pair is determined, the process continues to decision diamond 604 to determine if the code selected is used by any other channel on the uplink. If the code is not in use otherwise, the process continues to step 608 to apply the modulation path for transmission of the feedback information on the uplink. Else, the process continues to step 606 to determine a next best optimum transmission pair, which is then applied to the transmission of the feedback information on the uplink at step 608. Other criteria may be used to determine the optimum transmission pair, or to determine the transmission branch or code separately.

In a simulation performed to determine optimum transmission branch and code pairs, a Chipx4 waveform is implemented on the uplink with random spreading sequences. Further, Heterodyne Phase Shift Keying (HPSK) is used for modulation, and RRC 0.22 pulse shaping is applied. The DPDCH operates at 0, 12.2, 64, and/or 384 kbps. ACKnowledge/Negative ACKnowledge (ACK/NACK) transmissions assumed on the HS-DPCCH. PAR is measured for an HS-DPCCH mapped onto I or Q branch and all SF=256 channelization codes.

Results of the simulation are illustrated in FIGS. 7A through 7H for various configurations. The following Table 3 details the conditions for each of the simulation results.

TABLE 3

| FIG. | Bit rate kbps | Modulation Path |
|---|---|---|
| 7A | 0 | I |
| 7B | 0 | Q |
| 7C | 12.2 | I |
| 7D | 12.2 | Q |
| 7E | 64 | I |
| 7F | 64 | Q |
| 7G | 384 | I |
| 7H | 384 | Q |

Analysis of the results provides the following observations. When HS-DPCCH is mapped on the I branch, the optimum code appears to be c256,i, i=0 to 3. When HS-DPCCH is mapped on the Q branch the optimum code appears to be c256, 64. At 64 kbps, mapping the HS-DPCCH on the Q branch leads to 1.3 dB improvement in the PAR compared to mapping on the I branch. The gains are 0.8 dB for 12.2 kbps and 384 kbps cases. At 0 kbps, mapping the HS-DPCCH on the Q branch leads to 0.8 dB degradation in the PAR compared to mapping on the Q branch. Code indices equal to or higher than 64 overlap with the possible R99 DPCH code allocation.

The gains associated with the mapping the HS-DPCCH on the Q branch are significant, even considering the possibility for some overlap with the R99 DPDCH code tree. In contrast to a dynamic mapping scheme that is a function of the number of DPDCH used, in the exemplary embodiment the Node B is provided the branch and code information a priori. This avoids any problems associated with dynamic uplink mapping.

The simulation results suggest the Q branch mapping may be used when there is no overlap of the code on the Q branch. Similarly, the I branch mapping may be used otherwise. Specifically, the simulation results suggest the following mapping for the HS-DPCCH:

1. Q branch with channelization code c256, 64 when no TFC in the TFCS imply the transmission of more than one DPDCH channelization code 2. I branch with channelization code c256,i, i={0 . . . 3} otherwise.

Figure 8:
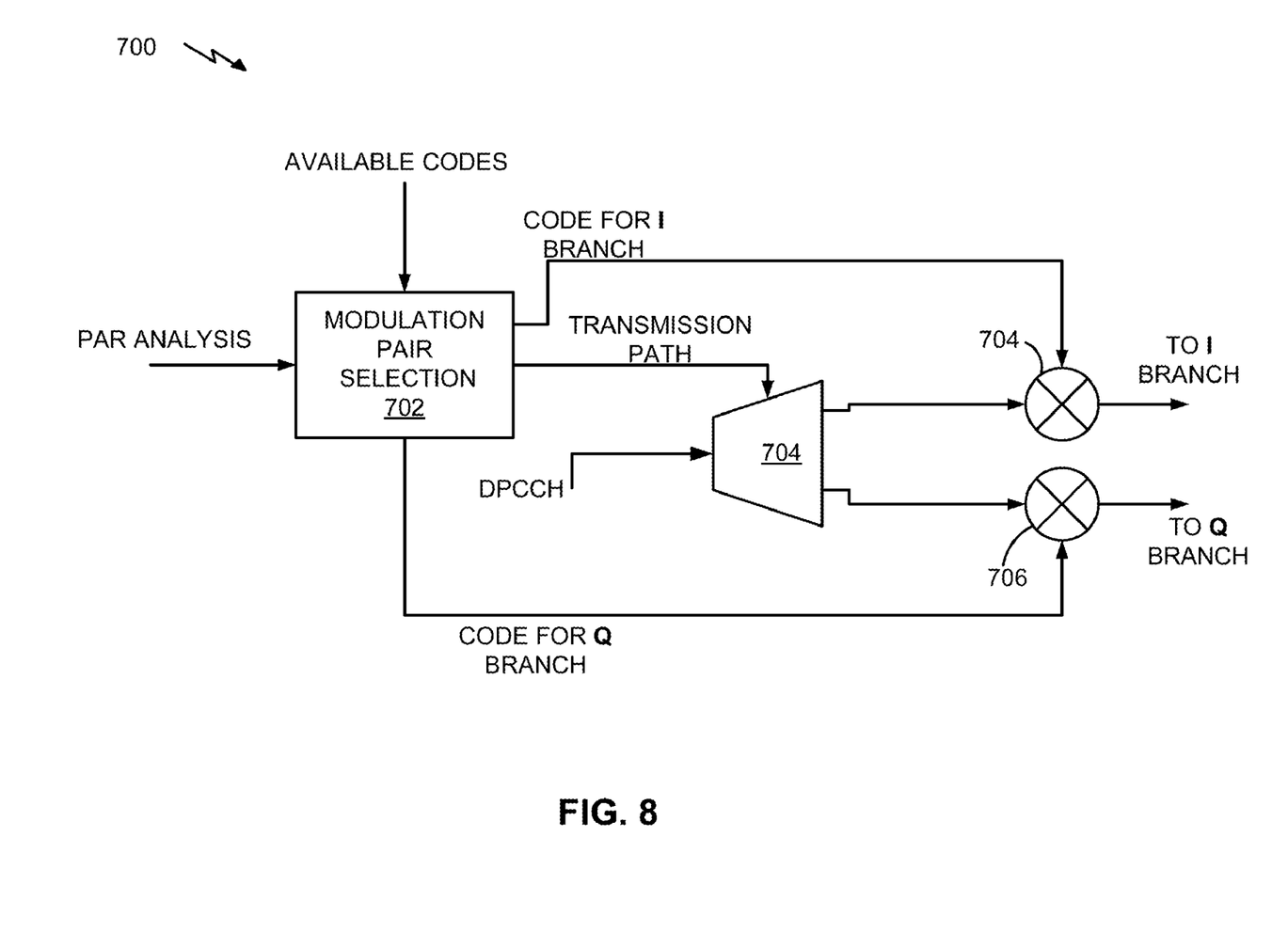
FIG. 8 is an apparatus in a communication system for determining an optimum transmission pair.

FIG. 8 illustrates an apparatus 700 for implementing the channel configuration as detailed hereinabove. The available codes, i.e., codes not used by other physical channels, are provided to a transmission pair selection unit 702 to determine an optimum code. Additionally, PAR analysis information is provided to the transmission pair selection unit 702, which also determines the modulation path on which to process the dedicated channel, DPCCH. The modulation path or branch is provided as a control to selector 704. The selector 704 also receives the DPCCH signal which is forwarded to the I branch or the Q branch in response to the control signal from the transmission pair selection unit 702.

The transmission pair selection unit 702 also provides the determined code to the determined modulation path. When the I path is selected, the transmission pair selection unit 702 provides the corresponding code to multiplier 706. When the Q path is selected, the transmission pair selection unit 702 provides the corresponding code to multiplier 708. The results are then forwarded to the appropriate path.

The exemplary embodiment provides a method and apparatus to determine a transmission configuration based on minimizing the PAR, or optimizing a channel condition, of the dedicated channel. In the exemplary embodiment, a mapping is selected for a modulation path, i.e., I branch or Q branch, as well as the code that results in the optimum performance for the channel. When the optimum code is not available, the system selects a next best optimum code.

Those of skill in the art would understand that information and signals may be represented using any of a variety of different technologies and techniques. For example, data, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of non-transitory storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A non-transitory computer-readable storage medium having stored thereon computer executable instructions for channelization of a plurality of communication channels in a spread spectrum communication system, wherein said plurality of channels includes dedicated physical data channels and a high speed dedicated physical control channel and wherein said channelization is by spreading said plurality of communication channels by a set of finite number of spreading codes, the stored computer-executable instructions configured to cause a computer to perform steps comprising:

spreading said high speed dedicated physical control channel using one spreading code of said set of finite number of spreading codes and on either a Quadrature branch (Q-branch) or In-phase branch (I-branch) of a channel spreader;

selecting either said Q-branch or I-branch of said channel spreader for the spreading of said high speed dedicated physical control channel based on a number of said dedicated physical channels in said plurality of communication channels;

selecting said one spreading code from said set of finite number of spreading codes based on whether said high speed dedicated physical control channel is being spread on said Q-branch or said I-branch of said channel spreader and said number of said dedicated physical channels in said plurality of communication channels.

2. The non-transitory computer readable storage medium of claim 1, wherein said dedicated physical control channel comprises an uplink for transmission of information within the spread spectrum communication system.

3. The non-transitory computer readable storage medium of claim 1, wherein said selecting steps are configured to minimize the Peak-to-Average Ration (PAR) of a signal transmitted over said spread dedicated physical control channel.

4. A non-transitory computer-readable medium having stored thereon computer-executable instructions for channelizing a plurality of communications channels in a spread spectrum communication system, the stored computer-executable instructions configured to cause a computer to perform steps comprising:

spreading a high speed dedicated physical control channel using one spreading code of a set of finite number of spreading codes and on either a Quadrature branch (Q-branch) or In-phase branch (I-branch) of a channel spreader;

selecting either said Q-branch or I-branch of said channel spreader for the spreading of said high speed dedicated physical control channel based on a number of dedicated physical channels in a plurality of communication channels; and selecting said one spreading code from said set of finite number of spreading codes based on whether said high speed dedicated physical control channel is being spread on said Q-branch or said I-branch of said channel spreader and said number of said dedicated physical channels in said plurality of communication channels.

* * * * *